United States Patent [19]

Edwards et al.

[11] Patent Number: 5,671,833

[45] Date of Patent: Sep. 30, 1997

[54] RETRACTABLE COAXIAL CABLE DEVICE

[75] Inventors: Michael V. Edwards; John C. Hostler, both of Phoenix, Ariz.

[73] Assignee: W.L. Gore & Associates, Inc., Newark, Del.

[21] Appl. No.: 636,254

[22] Filed: Apr. 23, 1996

[51] Int. Cl.⁶ ................................................. H02G 11/02
[52] U.S. Cl. ........................................ 191/12.2 R; 191/12.4
[58] Field of Search ............................... 191/12.2 R, 12.4; 439/4, 501; 273/148 B

[56] References Cited

U.S. PATENT DOCUMENTS

| | | | |
|---|---|---|---|
| 2,856,470 | 10/1958 | Hyde | 191/12.4 |
| 3,167,160 | 1/1965 | Vickers | 191/12.2 |
| 3,231,214 | 1/1966 | Gretsinger | 242/107.4 |
| 3,275,780 | 9/1966 | Baba | 200/153 |
| 3,296,387 | 1/1967 | Baigue | 191/12.4 |
| 3,588,389 | 6/1971 | Sato | 191/12.2 R |
| 3,657,491 | 4/1972 | Ryder et al. | 191/12.2 |
| 3,695,544 | 10/1972 | Morey, Sr. | 242/107 R |
| 3,876,405 | 4/1975 | Eilerman | 65/3 |
| 3,929,210 | 12/1975 | Cutler et al. | 191/12.2 |
| 3,953,566 | 4/1976 | Gore | 264/288 |
| 4,114,736 | 9/1978 | Scherenberg | 191/12.4 |
| 4,232,837 | 11/1980 | Cutler et al. | 242/107 |
| 4,384,688 | 5/1983 | Smith | 242/107.7 |
| 4,489,902 | 12/1984 | Chaconas et al. | 242/100.1 |
| 4,517,757 | 5/1985 | Asada et al. | 38/88 |
| 4,520,239 | 5/1985 | Schwartz | 191/12.4 |
| 4,713,497 | 12/1987 | Smith | 191/12.2 R |
| 4,721,833 | 1/1988 | Dubay | 191/12.4 |
| 4,842,108 | 6/1989 | Anderson et al. | 191/12.4 X |
| 4,940,859 | 7/1990 | Peterson | 191/12.4 |
| 5,022,600 | 6/1991 | Blanc et al. | 191/12.2 R X |
| 5,094,396 | 3/1992 | Burke | 242/107.1 |
| 5,372,225 | 12/1994 | Joynes et al. | 191/12.2 R |

OTHER PUBLICATIONS

Magazine: "Retractable TV Cable," Motor Home, Jun. 1996, pp. 110, 140.

Brochure: "Measuring Tapes, Levels, & Tools," Starrett, Bulletin No. 212, Aug. 1986, pp. 16–17.

*Primary Examiner*—Karen B. Merritt
*Assistant Examiner*—Scott L. Lowe
*Attorney, Agent, or Firm*—David J. Johns

[57] ABSTRACT

A retractable device for mounting a length of high speed coaxial cable is taught. The device allows for easy connection of coaxial cable to various electronic devices while also being readily disconnected and stored as needed. The device comprises a compact housing containing a thin coaxial cable having connectors at each end. The cable can be dispensed from the housing as needed and then drawn back into the housing using an actuator, such as a crank handle, following use. The device is particularly effective for establishing temporary electronic signal connections, such as connecting a television to a cable television signal source or a computer to a computer network. The coaxial cable used in the present invention is capable of high speed signal transmission, such as accurately transmitting a primary signal frequency in excess of 40,000 Hz.

24 Claims, 5 Drawing Sheets

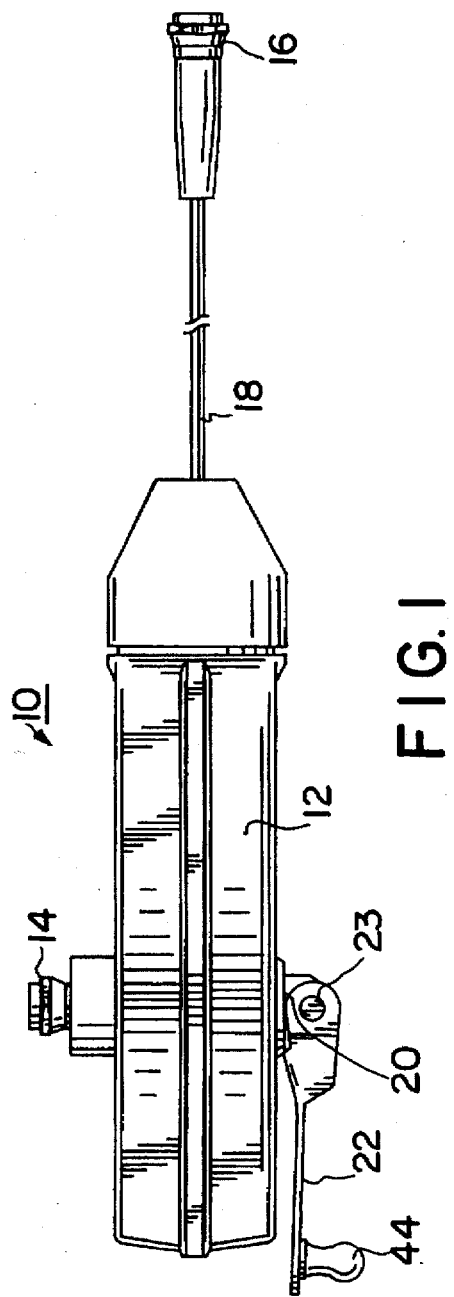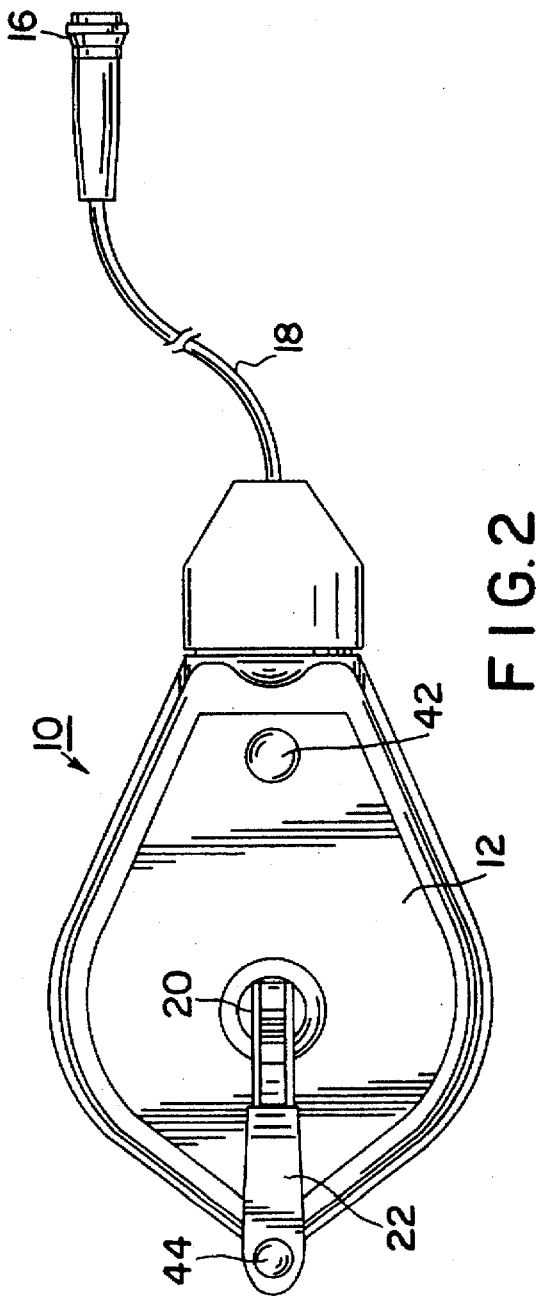

RETRACTABLE COAXIAL CABLE DEVICE

BACKGROUND OF THE INVENTION

1. Field of the Invention

The present invention relates to cables for use in transmitting electronic data, such as transmitting signals between a signal source and a computer, television, radio, or other electronic device.

2. Description of Related Art

Coaxial cables are widely employed today to carry signals between various electronic devices. Examples of electronic devices that typically receive such signals are televisions, displays, computers, CRT displays, transceivers, computer stations on a computer network, etc. Examples of electronic devices that typically transmit such signals are cable television (CATV) outlets, satellite dish antennas, computer networks, etc. Additionally, in applications such as computer networks and the like, each electronic device may serve as both a signal source and a signal receiver. These various applications share the property that the signal generally has a primary frequency greater than 40,000 Hz. As the term "signal" is employed herein it is intended to mean any electronic message, whether digital or analog, that conveys information (e.g., audio, picture, video, data, etc.) from one location to another or from one form to another.

Currently coaxial cables are widely employed to transmit such electronic signals. It is particularly common to use coaxial cable to electrically connect a television to a CATV outlet or satellite dish source. For the majority of these applications a rather stiff and large diameter coaxial cable is used, generally about 7.5 mm in diameter. For ease in reference, this class of cable is referred to herein as a "conventional CATV coaxial cable," whether the cable is being used for CATV, satellite signal, data signal, or other signal transmission purposes. These cables typically use a solid center conductor, which acts as the center pin in the termination, a solid or full density dielectric, normally of polyethylene or polypropylene, a foil shield, a braid made up of smaller conductors, and a suitable insulative jacket. The cables are selected for their low cost and for their reasonably good signal transmission properties. Given the size of these cables and the materials from which they are usually constructed, these cables normally cannot be tightly coiled without kinking. For most applications these cables are permanently strung along long, relatively straight paths and normally do not need to be coiled, flexed, or otherwise vigorously manipulated during daily use.

Applications exist where the use of a coaxial cable to transmit a signal is an intermittent need. Examples of this type of application would be connecting a television in a recreational vehicle (RV) to a CATV or satellite signal source, or the connections made between a lap top computer and a base monitor or network (either a local area network (LAN) or wide area network (WAN)). In these instances, full sized CATV coaxial cable is commonly used, but it has proven to be large, stiff, and unwieldy, making it difficult to manipulate and store.

It would seem desirable in these less permanent applications to employ a cable in some form of dispenser to make it easier to attach and detach the electronic device from a signal source. It is known that other forms of electrical cords can be mounted in retractable housings to ease cable manipulation. For instance, a retractable power cord reel is disclosed in U.S. Pat. No. 3,275,780, where an electrical power cord is mounted on a spring actuated reel. Additional examples of reels that provide a retractable means for storing and supplying power cables are disclosed in U.S. Pat. Nos. 3,167,160, 3,657,491, 3,231,214, 3,695,544, 3,876,405, 3,929,210, 4,114,736, 4,232,837, 4,489,902, 4,517,757, 4,520,239, and 4,721,833.

U.S. Pat. Nos. 3,630,466 and 3,854,017 describe spring-loaded reel assemblies for electrical appliance or telephone handset cords. Again, the focus of these disclosures is on low frequency power or audio signals, where the primary frequency is well less than 40,000 Hz. Similar retractable reel systems are described in U.S. Pat. Nos. 4,685,634 (a portable retractable reel system) and 5,094,396 (a very compact retractable reel assembly for telephone cord extension). While these patents disclose highly portable retractable reel assemblies, it is again for use with electrical extension cords or with telephone cords where the cable is not coaxial or intended for high frequency signals.

Other retractable cable devices are described in U.S. Pat. Nos. 4,713,497 (a retractable self storing reel system for electrical cable) and 4,384,688 (a reel for storing an extensible, retractable electrical cord, signal cable, fluid conducting hose and the like). In both of these patents the disclosure relates to overcoming the problems associated with conventional commuting rings and brushes of a rotating electrical connection of in the cable storage system, particularly for low level electrical signals and shielded cables, such as in the range of 20 Hz to 20,000 Hz.

It would appear desirable to provide a conventional CATV cable on some form of retractable reel to make temporary electronic installations easier to connect and disconnect. Unfortunately, these cables do not readily lend themselves to packaging similar to conventional power and telephone cables. Coaxial cables carrying signals over 40,000 Hz comprise a multiple layered construction with sufficient internal integrity to avoid being crushed or otherwise deformed, which could lead to signal distortion. As the complexity of the signal increases, the risk of signal loss due to distortion is an ever increasing problem. In order to provide this structural integrity these cables are generally made from materials that form a stiff and unwieldy package.

As a result, a conventional CATV cable simply does not readily spool into a retractable device. Moreover, even if these cables could be made more supple, the 7.5 mm thickness of these cables still requires a relatively large package once a significant length of cable is wound into the spool.

It is accordingly a primary purpose of the present invention to provide a convenient and compact retractable coaxial cable mounted in a housing for use in attaching electronic devices to a signal source and transmitting signals in excess of 40,000 Hz.

This and other purposes of the present invention will become evident from review of the following specification.

SUMMARY OF THE INVENTION

The present invention is a retractable coaxial cable contained within a housing, which provides an improved means for making temporary signal connections. The coaxial cable is specifically designed to be small in diameter, flexible, and lightweight so as to be contained in a small and convenient housing. This offers a great improvement over the existing cables, allowing the reeled cable to be stored without tangling in a space small enough as to easily stored (e.g., readily fit in an average desk drawer). Additionally, this type of coaxial cable and housing can be incorporated into the larger housing of an electronic device, such as a lap top computer or a television, without adding significant size or weight to the original housing.

The coaxial cable of the present invention employs materials to maintain the cable diameter, weight and stiffness to a minimum while providing the best possible signal fidelity. The coaxial cable is then mounted in a small and light housing with excellent durability. Because the coaxial cable developed for this application is smaller, more flexible, and much less obtrusive than conventional CATV-type coaxial cable used for more permanent installations, and the cable offers durability and signal quality similar to conventional cable, it is anticipated that the use of these cables may not be limited to temporary installations.

DESCRIPTION OF THE DRAWINGS

The operation of the present invention should become apparent from the following description when considered in conjunction with the accompanying drawings, in which:

FIG. 1 is a side elevation view of a retractable coaxial cable device of the present invention, displaying the coaxial cable in a partially extended position and with a crank handle shown in an extended position;

FIG. 2 is a front elevation view thereof;

DETAILED DESCRIPTION OF THE INVENTION

The present invention is a retractable coaxial cable device for use in signal transmission between electronic devices.

Figure 3:
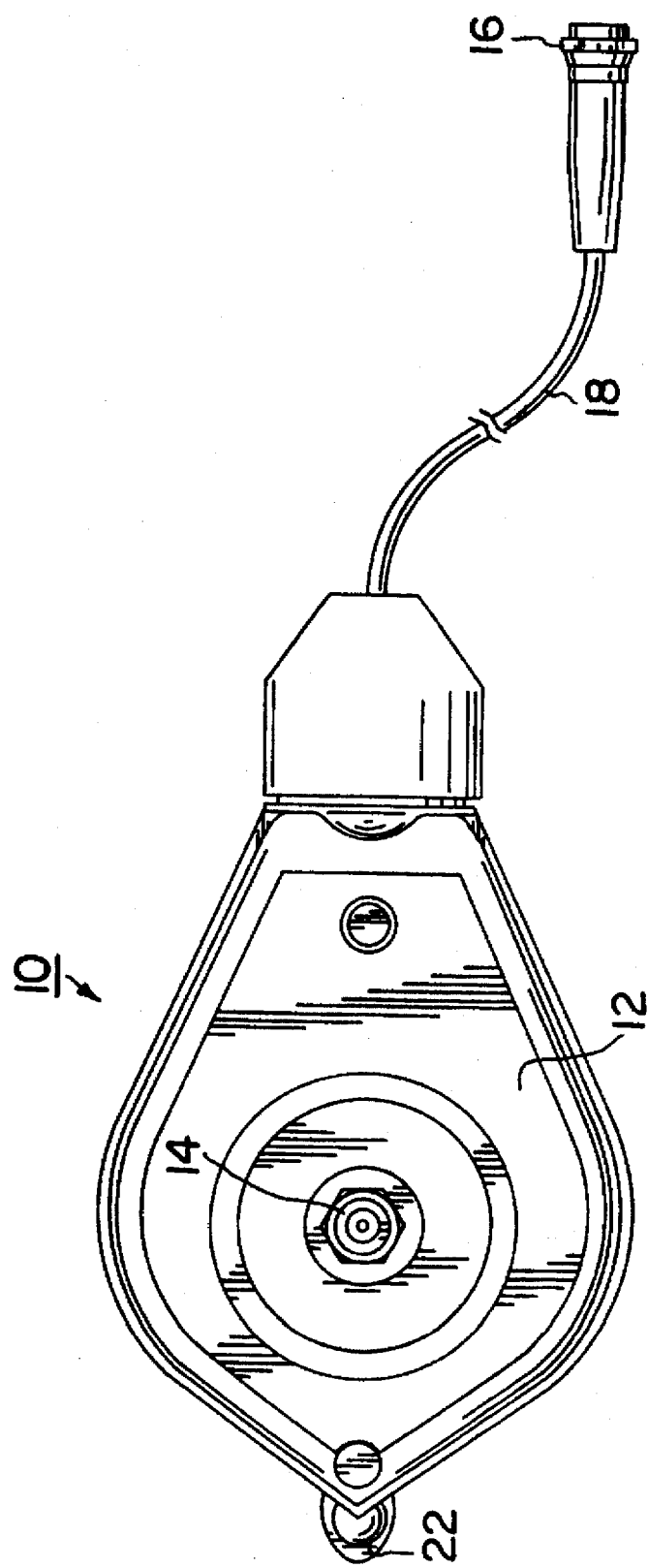
FIG. 3 is a back elevation view thereof.

Shown in FIGS. 1, 2, and 3 is a preferred embodiment of the retractable coaxial cable device 10 of the present invention. The device comprises a housing 12, a first coaxial cable termination 14, a second coaxial cable termination 16, a coaxial cable 18 extending between the first and second terminations, and an actuator 20 to retract the cable 18 into the housing 12. Ideally, the device 10 is quite compact, storing 7 to 25 meters of cable within a housing that measures no more than about 180 mm long, about 90 mm wide and about 35 mm thick (not including crank mechanism and first termination); and has an internal volume less than about 570 cubic centimeters. It is believed particularly preferred to contain an extended length of cable, such as up to 25 and 30 or more meters in a very compact container, such as one having an internal volume of less than 600 cc.

These compact dimensions are possible due to the unique properties of the coaxial cable 18 used in the present invention. As has been noted, conventional CATV coaxial cable (i.e., RG-6/u Type, 18 (1) AWG center conductor, or RG-59/u, 22(1) AWG center conductor type cable) is normally about 7.0 mm in diameter and is relatively stiff and hard to bend.

Industry standards for bend radii for coaxial cables vary from 5 to 10 times the outer diameter of the cable. In NASA's "Requirements for Interconnecting Cables, Harness, and Wiring," NHB5300.4 (3G), April 1985, the minimum bend radius recommended for individual coaxial cables (page 15) is 6×O.D. Using this guideline, the minimum bend radius for an RG-6/u type of coax would be approximately 4.2 cm. A length of this cable 8 meters long wound on a spool 2.54 cm wide (with a core diameter of 8.4 cm) would require a spool flange diameter of at least 17.0 cm.

By contrast, the coaxial cable 18 used in the present invention is a mere 1.1 to 2.7 mm in diameter. Using the NASA recommendation, the minimum bend radius for a cable 1.8 mm in diameter would be 1.1 cm. A length of coaxial cable 18, eight (8) meters in length wound on a spool 2.54 cm wide (with a core diameter of 2.3 cm) would require a spool flange diameter of at least 4.6 cm. Thus, it is readily apparent that the subject invention delivers very compact physical dimensions.

By way of example, a preferred cable of the present invention comprises a cable diameter of about 1.8 mm. This cable construction can execute a 360° bend over a diameter of less than about 18 mm without damage to the cable. This allows for a relatively tight spooling of the cable and the provision of a relatively long cable into a very compact case. Similarly, a cable having a diameter of 2.7 mm can be bent 360° over a diameter of 2.7 mm without damage.

In operation, the coaxial cable 18 is dispensed from the housing 12 a sufficient amount to span a desired distance. The first coaxial termination 14 is then connected to an electronic device, either directly or through another coaxial cable, and the second coaxial cable termination 16 is likewise connected to an electronic device, again either directly or through another coaxial cable. Once a connection is no longer required, one or both of the connections can be disconnected and the coaxial cable 18 can be withdrawn back into the housing using the actuator 20.

In its simplest form, the actuator 20 comprises a crank handle 22 that rotates a rotating member (e.g., an axle, spool, or reel) around an axis of rotation within the housing 12 and draws the cable into the housing around the spool. The actuator may likewise comprise any number of other forms. For example, other actuator means may comprise a spring or springs, a motor (e.g., an electric motor), an elastomeric mount (e.g., a elastomeric band or hub that supplies return tension), coil memory of the coaxial cable itself, magnetic means, etc.

Figure 4:
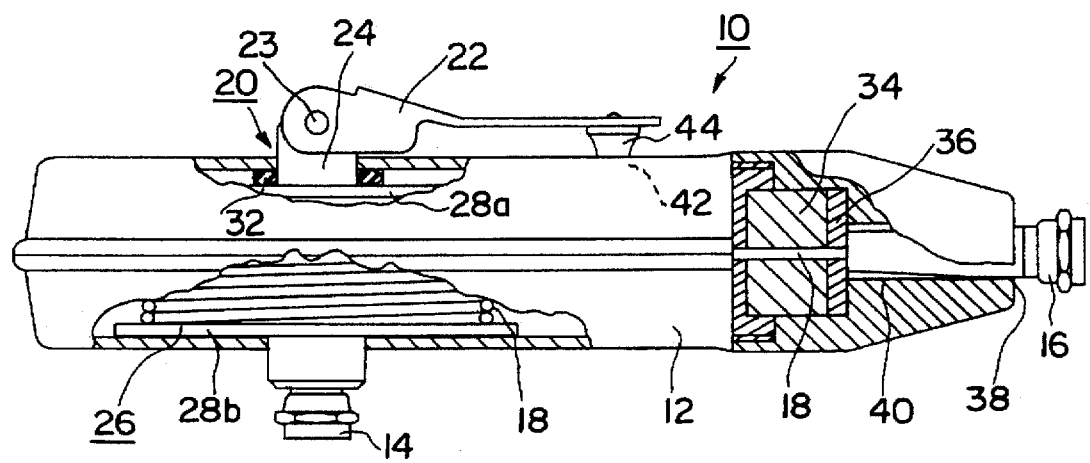
FIG. 4 is a side elevation view of the retractable coaxial cable device of the present invention, shown partially in cut-away, with the crank handle shown in a folded position.
Figure 5:
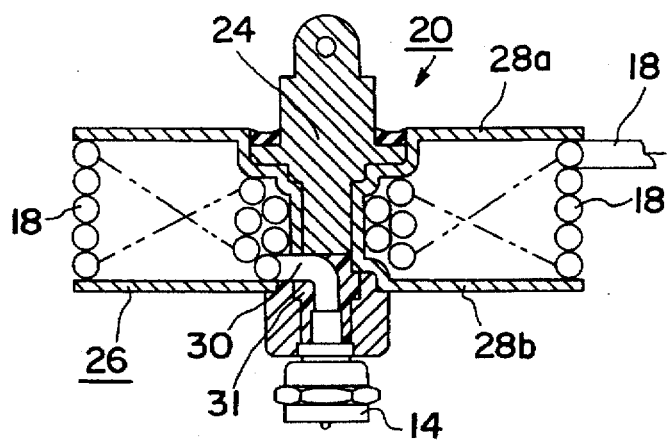
FIG. 5 is a cross section through the axis of rotation of a rotatable member for use in the device of the present invention, the crank handle not shown and the cable termination not sectioned.

As is shown in FIGS. 4 and 5, the preferred construction comprises a rotating member 20 mounted within the housing 12 with the crank handle 22 attached to an axle 24 of the rotating member. To aid in centering the cable 18 on the rotating member, it is preferred to provide a spool 26 having side walls 28a, 28b. For ease in termination, it is preferred that the cable 18 is terminated within the axle 24 of the rotating member so sliding terminations need not be provided. It should be understood, however, that it is possible to provide sliding connections within the device so that the first termination 14 can be located virtually anywhere in the housing 12. As is evident from FIG. 5, the small diameter and flexibility of the coaxial cable 18 is again employed to execute curved transition 30 between the portion of the cable 18 wrapped around the spool 26 and the first termination 14.

Potting compound 31 or similar resilience material can be provided around the curved transition to serve as strain relief to protect the first termination 14 and to assist in maintaining the orientation of the transition 30.

It has been found that the operation of the rotating member 24 can be improved by providing a resilient seal 32, such as a felt washer, between the spool 26 and the housing 12 to maintain snug positioning of the spool 26 within the housing. Operation can be further enhanced by providing a felt wiper 34 and a guide 36 to aid in the transitioning of the cable 18 into the housing from open end 38.

To further aid in maintaining a compact size for the device 10 when the cable 18 is fully retracted, as is shown in FIG. 4, a cavity 40 may be provided in the open end 38 of the device so that most of the second termination 16 can be withdrawn into the housing when not in use. This construction also helps protect the second termination 16 from damage from undue bending and the like during storage.

The compact size of the device 10 can be further enhanced by employing a crank handle 22 that folds, such as along pivot 23, between an operative position, as shown in FIGS. 1 through 3, and a stored position, as shown in FIG. 4. An indentation 42 can be provided in the housing 12 to help accommodate knob 44 on the handle 22 when in a folded, stored position.

Although the first termination 14 is shown as a fixed hub in this embodiment, it should be appreciated that this termination may take a variety of forms without departing from the present invention. For instance, the first termination 14 may comprise its own (preferably short) span of cable to aid in connection to a first electronic device. It may also be possible to provide a second reel of cable to permit cable to be dispensed from either termination 14, 16 of the cable as needed. As is discussed in further detail below, the first termination 14 may also be "hot wired" directed into an electronic device.

Figure 6:
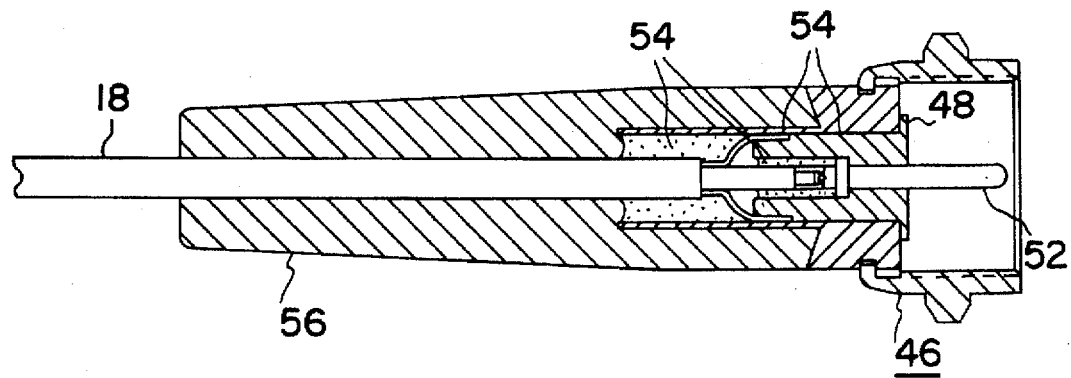
FIG. 6 is a detailed cross-section view of a termination of the coaxial cable device of the present invention, incorporating strain relief means.
Figure 7:
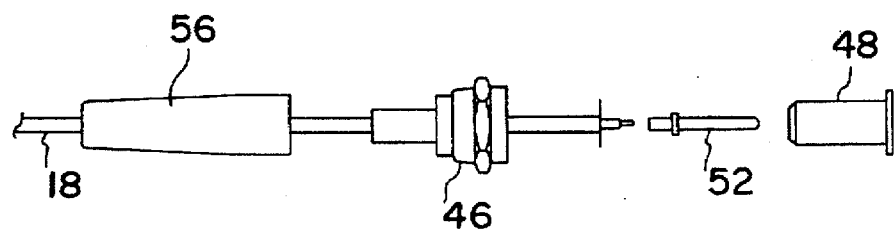
FIG. 7 is an exploded side elevational view of the coaxial cable subassembly of the present invention shown in FIG. 6.

The second termination 16 is shown in detail in FIGS. 6 and 7. The second termination 16 comprises coaxial cable 18, connector body 46, contact adapter 48, and contact assembly 52. The parts are assembled in the manner shown and can be held in place using adhesive and/or potting compound 54 as needed. To create a more rugged assembly, it is further preferred that a strain relief boot 56 be provided to protect the transition between the connector body 46 and the coaxial cable 18.

The heart of the present invention comprises the coaxial cable 18 itself. As has been explained, it is important that the cable be maintained as small and as flexible as possible in order to maintain the compact size of the device 10 of the present invention. However, it is equally important that the coaxial cable 18 be fully capable of reliably transmitting high speed data along its length.

In this respect, the coaxial cable 18 for use in the present invention must be of the proper impedance and have sufficiently low attenuation as to be useful in transmitting the signal required for a given application. It is known that the impedance of a cable is defined by the following equation:

$$\text{Impedance} = 138/\sqrt{E_r} \times \log(D/d)$$

where Er is the dielectric constant of the insulation, and d is the effective diameter of the center conductor. The effective diameter in the case of a solid conductor is its physical diameter. For stranded conductor, the effective diameter is the physical diameter multiplied by a stranding factor to give an effective diameter. The stranding factor for 7 strand wire is 0.939 and for 19 strand wire is 0.979. D is the diameter of the dielectric material surrounding the center conductor and maintaining the distance between the shield of the coaxial cable and the center conductor.

It can be seen from this equation that for a given conductor size and impedance requirement, that one can minimize the diameter of the cable by using a dielectric material with the lowest possible dielectric constant.

The attenuation of a coaxial cable can be described by the physical dimensions of the cable, the dielectric properties of the insulation, and the surface conductivities of the conductors employed. Again, best attenuation for a given diameter coaxial cable will occur when the dielectric constant of the material surrounding the center is minimized. However, the exact amount of attenuation that is functional in this application is a function of a receiver's sensitivity, the length of the cable, and the strength of the signal.

In order to achieve a low dielectric constant, one should start with a low dielectric constant material. Suitable materials for use in the present invention include but are not limited to: polytetrafluoroethylene (PTFE); a copolymer of PTFE, such as FEP, PFA, expanded PTFE, etc.; polyethylene (PE); polypropylene (PP); or one of the copolymers of these polymers. The dielectric constant of these materials can be further reduced by introducing air, nitrogen, or a similar gas into the physical structure of the dielectric material. It is believed to be particularly preferred to use an expanded PTFE (ePTFE), where air is introduced into the physical structure of the PTFE dielectric material by the spacing created between the nodes and fibrils of these structures, such as through the process described in U.S. Pat. No. 3,593,566 to Gore, incorporated by reference. Additionally the introduction of gas cells into PE, PP, PFA, FEP, and ePTFE to create low dielectric constant foams for use in coaxial cable production is also well known to those skilled in the art. For this application it is highly desirable to reduce the dielectric constant of the coaxial cables dielectric material as much as possible, to reduce the diameter, and improve the attenuation of the cable. However, the dielectric constant cannot be reduced to the point where the physical properties and durability of the dielectric material are impacted by the introduction of too much void space.

The coaxial cable of the present invention should be capable of transmitting data with a primary frequency at or above 40,000 Hz without distortion or loss. In particular, it is preferred that the cable of the present invention has the following electrical properties: about 75 Ω impedance, less than about 20 pF/ft capacitance, and a dielectric constant of less than about 1.80. The coaxial cable 18 should ideally be capable of reliably transmitting data from 40,000 to 1,000,000,000 Hz, and more preferably 54,000,000 to 1,000,000,000 Hz.

Figure 8:
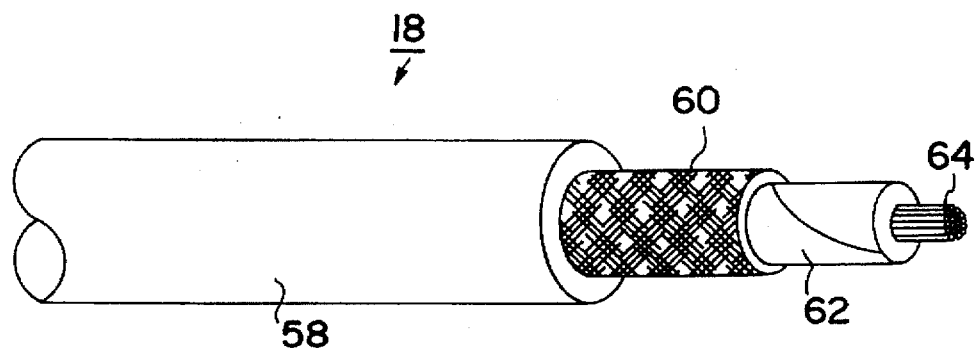
FIG. 8 is a three-quarter perspective view of a preferred coaxial cable for use in the present invention.

The preferred construction of the coaxial cable of the present invention is shown in FIG. 8. In this construction the cable 18 comprises: a polymer outer jacket 58, such as polyurethane; a foil, served wired, or braided shield layer 60, such as a silver plated copper braid; an insulative layer 62, such as one formed from a tape or sleeve of expanded PTFE; and a center conductor 64, such as a single or multiple strand of silver plated alloy.

The preferred construction for the coaxial cable 18 for use in the present invention comprises: an outer jacket 58 of extruded polyurethane, approximately 0.2 to 0.4 mm thick; a shield layer 60 of 42(1) AWG silver plated CDA 110 copper braid with >90% coverage, approximately 0.1 to 0.2 mm thick; a insulative layer 62 of tape wrapped expanded PTFE, and particularly a high strength expanded PTFE with a matrix tensile strength of >50 kpsi, approximately 0.3 to 0.4 mm thick; and a center conductor 64 of 32 (19/42) AWG silver plated copper alloy, such as Phelps Dodge PD-135. Overall, this preferred cable comprises a diameter of about 2.1 mm or less.

A wide variety of alternative components may be employed in the cable of the present invention while maintaining its desirable properties. For example, the center conductor may be constructed from 30–36 AWG stranded or solid conductors, such as CDA 101, 102, 110 and various other copper alloys. It should be appreciated, however, that smaller conductors increase attenuation and are more likely to break when subjected to stress.

Examples of other dielectric layers include expanded or solid PTFE, solid or foamed FEP, PFA, TFE, polyethylene, polypropylene, solid or perforated polyimides or polyesters. It is desirable to choose a fairly high strength dielectric, such as expanded PTFE, to help with load sharing when the cable is subjected to tensile load.

Examples of other shield layers include 38 to 44 AWG silver plated CDA 101, 102, and various copper alloys. The shield layer may be either braided or serve and may be used in conjunction with a metallized polyester shield. Coverage of the shield layer should be about 40 to 100% for best performance. It is particularly preferred that the shield layer should have at least 90% coverage for increased shielding effectiveness.

Examples of other jacket layers include extruded or tape wrapped PVC, polyester, fluorocarbons, and the like. It is preferred that the jacket layer has high abrasion resistance, such as that provided by a polyurethane jacket.

It may also be possible to employ commercially available smaller diameter coaxial cables in the present invention. For instance, a RG179 coaxial cable uses a 0.012" (0.3 mm) center conductor with a polytetrafluoroethylene dielectric, a foil shield, a braid of small conductors, and a jacket with an overall diameter of about 0.1" (2.5 mm). This cable is presently used for CATV or similar applications particularly in conjunction with a 75 ohm type F connector supplied by Pacific Electric Cord Co., Cat No. C5307-2C-SL.

Constructed in the manner described above, the retractable cable device 10 of the present invention provides a host of benefits. The device 10 is very easy to transport and store. In use, the cable readily pulls out to the desired length and is thin and flexible enough to be easily handled and manipulated around objects, such as furniture and the like. In operation, the device provides excellent signal transmission properties, readily providing accurate signal transmission at and well above 40,000 Hz. When a connection is no longer needed, the device can be quickly disconnected and readily wound into its compact case for storage.

With these properties, the device of the present invention is particularly suitable for use with all forms of temporary signal hook-ups. For instance, boat or recreational vehicle (RV) connections to CATV or satellite TV can be easily and reliably made with the device of the present invention. Moreover, its compact size makes it particularly suitable for storage in the tight confines of such vehicles.

The compact nature and ease in handling and storing of the cable of the present invention also makes it ideal for other cable connections, such as use in computer networking, digital signal transmission, etc.

As has been noted, the device of the present invention may also be modified to suit other signal transmission needs. For example, it is believed that it will be a welcomed addition to many electronic devices if a retractable coaxial cable were included within the housing of the device itself.

Figure 9:
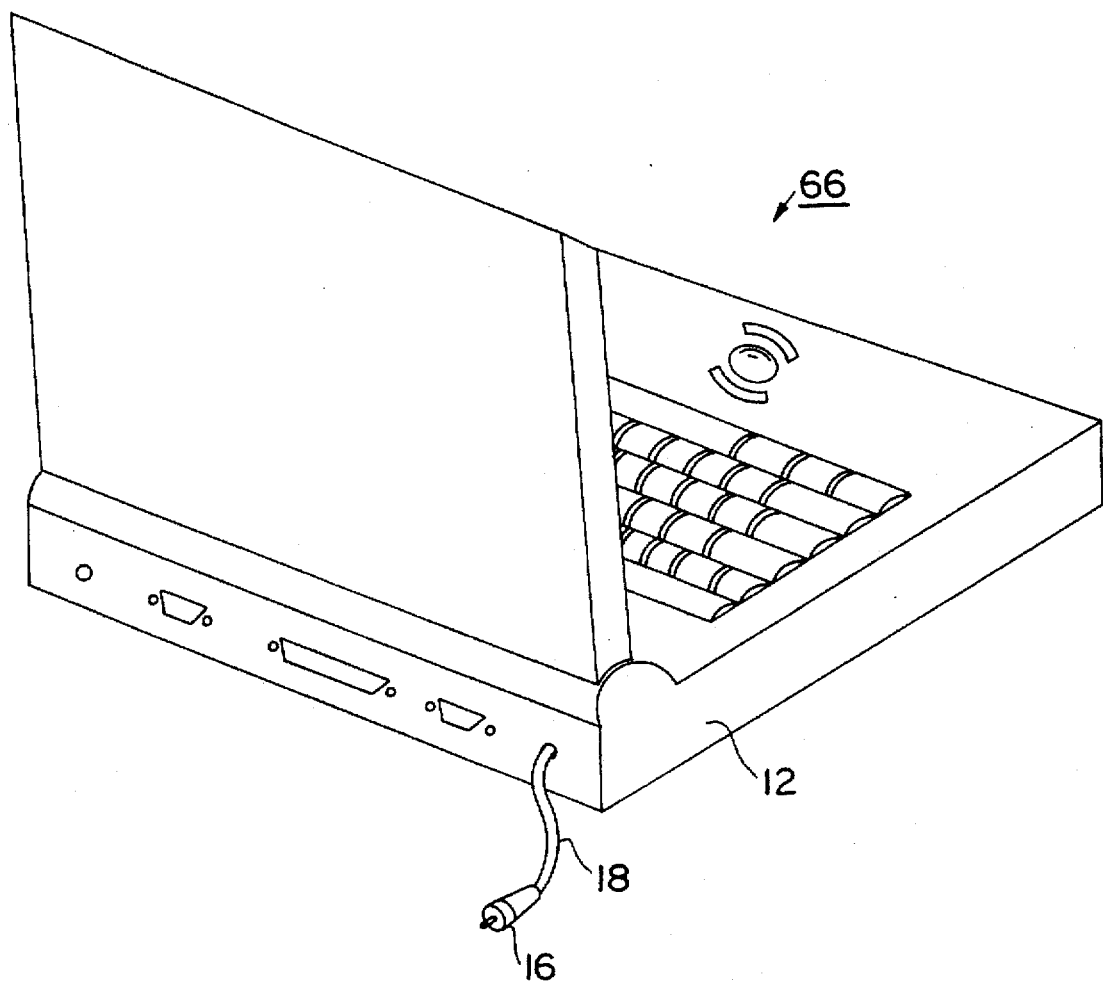
FIG. 9 is a side elevational view of an electronic device wherein the retractable coaxial cable of the present invention is incorporated into the larger housing of the electronic device.

This may be particularly applicable to cable-ready televisions and video equipment, computers, portable satellite disks, digital radio tuners, etc. FIG. 9 illustrates one example of such a construction. In this instance, the device 10 is mounted within a notebook computer 66. As such, the computer case serves as the housing 12. The cable 18 can be withdrawn from the case as needed and connected using the second connector 16. The first connector is located within the case of the computer and can be directly wired into the applicable circuitry of the computer. The cable in this instance is preferably wound into the case by a spring or motor so that a crank handle need not be provided. The result is that the electronic device can be easily and quickly connected and disconnected from a signal conduit to other electronic devices as needed and without the need for bulky cable connections. The high speed nature of the coaxial cable of the present invention makes this particularly suitable for high speed data transmission.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A retractable coaxial cable device comprising:

a coaxial cable with a predetermined length, the coaxial cable being capable of accurately transmitting a signal with a primary frequency of at least 40,000 Hz;

terminations at each end of the coaxial cable;

a rotatable member of sufficient dimensions to have the length of coaxial cable wound around the rotatable member;

an actuator to wind the coaxial cable around the rotatable member;

a housing containing the rotatable member, the housing allowing rotation of the rotatable member, at least one end of the coaxial cable exiting the housing; and wherein the housing has an internal volume of less than about 600 cc and contains a length of at least 7 meters of coaxial cable therein.

2. The device of claim 1 wherein strain relief is provided at each termination of the coaxial cable.

3. The device of claim 1 wherein the housing includes a guide to protect the cable exiting the housing.

4. The device of claim 1 wherein the housing has dimensions of less than about 180 mm by about 90 mm by about 35 mm.

5. The device of claim 1 wherein the cable is at least 8 meters in length.

6. The device of claim 1 wherein the rotatable member has an axis of rotation and one of the terminations is mounted parallel to the axis of rotation of the rotatable member.

7. The device of claim 6 wherein a portion of the coaxial cable that exits the rotatable member parallel to the axis of rotation is encapsulated within a potting compound.

8. The device of claim 1 wherein the actuator is a crank handle attached to the rotatable member.

9. The device of claim 8 wherein the crank handle incorporates a pivot, allowing the crank handle to be folded against the housing.

10. The device of claim 9 wherein the housing has a depression which will accommodate a portion of the crank handle when it is folded against the housing.

11. The device of claim 1 wherein the coaxial cable comprises a diameter of less than about 2.7 mm.

12. The device of claim 11 wherein the coaxial cable is sufficiently flexible to execute a 360° bend over a diameter of less than about 27 mm without damage to the cable.

13. The device of claim 11 wherein the cable has a diameter of about 2.1 mm or less.

14. The device of claim 13 wherein the coaxial cable and the terminations are proportioned for standard cable television attachment.

15. The device of claim 13 wherein the cable has a diameter of about 1.8 mm.

16. A retractable coaxial cable device comprising a housing having a rotatable member therein and at least one open end;

a coaxial cable having a diameter of no more than 2.7 mm, the coaxial cable wound around the rotatable member and having a first termination at a first end and a second termination at a second end;

connectors on each of the ends of the coaxial cable adapted to be attached to electronic devices for the transmission of high speed signals through the coaxial cable;

an actuator for wrapping the cable around the rotatable member;

wherein the coaxial cable can be drawn from the housing by its second end through the open end of the housing;

wherein the cable can be drawn back into the housing by the actuator; and wherein the housing has an internal volume of less than about 600 cc and contains a length of at least 7 meters of coaxial cable therein.

17. The device of claim 16 wherein the housing has dimensions of less than about 180 mm by about 90 mm by about 35 mm.

18. The device of claim 16 wherein the actuator comprises a crank.

19. The device of claim 16 wherein the first end of the coaxial cable is mounted coaxial with the rotatable member.

20. The device of claim 16 wherein the coaxial cable is sufficiently flexible to execute a 360° bend over a diameter of less than 27 mm without damage to the cable.

21. The device of claim 16 wherein the cable is at least 8 meters in length.

22. The device of claim 16 wherein the cable has a diameter of about 2.1 mm or less.

23. The device of claim 22 wherein the coaxial cable and the terminations are proportioned for standard cable television attachment.

24. The device of claim 22 wherein the cable has a diameter of about 1.8 mm.

* * * * *